US008799875B2

(12) United States Patent
Ziegler et al.

(10) Patent No.: US 8,799,875 B2
(45) Date of Patent: Aug. 5, 2014

(54) STREAMLINING UNIT TESTING THROUGH HOT CODE SWAPPING

(75) Inventors: Leo Ziegler, Redwood City, CA (US); Vincent J. Hardy, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 389 days.

(21) Appl. No.: 12/894,900

(22) Filed: Sep. 30, 2010

(65) Prior Publication Data

US 2012/0084754 A1    Apr. 5, 2012

(51) Int. Cl.
*G06F 9/44* (2006.01)

(52) U.S. Cl.
USPC .......................................................... 717/135

(58) Field of Classification Search
USPC .................................. 717/124, 135
See application file for complete search history.

(56) References Cited

U.S. PATENT DOCUMENTS

| | | | | |
|---|---|---|---|---|
| 5,495,571 A | * | 2/1996 | Corrie et al. | 714/38.1 |
| 6,002,869 A | * | 12/1999 | Hinckley | 717/124 |
| 6,289,382 B1 | * | 9/2001 | Bowman-Amuah | 709/226 |
| 6,895,578 B1 | * | 5/2005 | Kolawa et al. | 717/130 |
| 2004/0194020 A1 | * | 9/2004 | Beda et al. | 715/502 |
| 2008/0301702 A1 | * | 12/2008 | Gibbs et al. | 719/311 |

OTHER PUBLICATIONS

Karlesky, Michael, et al. "Mocking the embedded world: Test-driven development, continuous integration, and design patterns." Proc. Emb. Systems Conf, CA, USA. 2007.*

* cited by examiner

*Primary Examiner* — Li B Zhen
*Assistant Examiner* — Joanne Macasiano
(74) *Attorney, Agent, or Firm* — Kilpatrick Townsend & Stockton LLP

(57) ABSTRACT

Methods and systems are described for testing methods and other functions by swapping external functions for mock functions. A test case definition is entered by a programmer, which can specify the expected number of arguments and argument values of external function or method calls, the context state, the return value, and any expected error conditions. The test case definition is used by a function tester to automatically create mock functions, modify the target function so that it calls the mock functions, execute the target function with specified arguments and a test context, and then compare the results to expected results.

20 Claims, 8 Drawing Sheets

STREAMLINING UNIT TESTING THROUGH HOT CODE SWAPPING

CROSS-REFERENCES TO RELATED APPLICATIONS

NOT APPLICABLE

BACKGROUND OF THE INVENTION

1. Field of the Art

The present disclosure relates generally to the field of data processing in dynamic programming languages. Specifically presented are methods and systems for automatically testing methods and other functions using hot code swapping in JavaScript® and other ECMAScript-compatible languages.

2. Description of the Related Art

Computer programming languages have developed rapidly over the years. Modern computer languages typically include provisions for declaring classes, from which objects are instantiated. This allows object-oriented approaches to programming. Object-oriented programming commonly allows encapsulation of code so that the code is modular and reusable for other programs as well as easier to abstract in regard to real-world things.

In computer programming, functions include subroutines that typically perform processing tasks. Such functions can be called from another part of a software program. Functions can also include main routines (e.g., main( ) in the C programming language) that are initially called upon program execution. A function can have explicit inputs that are often called arguments, although some functions have no explicit inputs. Functions can be used to return a value (or multiple values in some instances), change variables, or perform other processing.

A function that is anchored to a class or object is often called a method. The object to which the method is anchored is sometimes called a context, or 'this.' object in JavaScript. The internal variables, properties, and other settings of the context are sometimes called a "context state." Often, a method of an object is called in order to change the object's context state. For example, to set property 'X' of object 'obj', a method such as obj.setX( ) can be called. The same property could be read by calling obj.getX( ).

Although many modern programming languages are designed to be compiled before they execute, other modern programming languages are interpreted on the fly during program execution. Some of the interpreted languages also belong to the family of "dynamic programming languages" in that their source code can be added to, objects and definitions can be extended, and/or their type systems can be modified during program execution (i.e., at runtime). The JavaScript® programming language is one example of a dynamic programming language. JavaScript is sometimes referred to as a dialect of ECMAScript.

ECMAScript is a computer programming scripting language complying with Ecma International's ECMA-262 specification and International Organization for Standardization (ISO)/International Electrotechnical Commission (IEC) 16262. Ecma was formerly known as the European Computer Manufacturers Association (ECMA). ECMAScripts include Netscape/Sun/Oracle JavaScript, Microsoft JScript, and Adobe ActionScript.

Testing of JavaScript® programs sometimes involves testing each method of each object individually, at the unit level. Thus, a method that horizontally centers a rectangle object with the center of a display is sometimes tested in isolation from all other methods of the object, including a method that vertically centers the rectangle object on the display. Testing can involve writing programs that automatically test the method. Although testing each and every method separately with automated programs can minimize errors later on, it can be very tedious for programmers to test at the lowest levels for hundreds or thousands of methods of many classes/objects in large programs. Test-driven development techniques take testing further so that automated test programs take a high priority.

Software development methodologies like Extreme Programming have popularized test driven development techniques. In particular, unit testing has met a fairly wide adoption thanks to frameworks like JUnit. However in many frameworks and languages, writing tests can be a cumbersome and time-consuming process. For example, it can be difficult to write a unit test for a complex algorithm.

Unit testing usually means focusing on one unit of code; references to all code "external" to that unit should be abstracted. Abstracting the 'external' code often requires extra work in order to implement so-called mock objects to represent it.

There exists a need in the art for better techniques to more easily test functions and methods, especially in widely supported, object-oriented, dynamic programming languages such as JavaScript.

BRIEF SUMMARY OF THE INVENTION

Embodiments in accordance with the present disclosure relate to replacing the code within external functions called in a (to-be-tested) target function with automatically-created mock code, executing the target function, and then comparing predefined, expected results with those actually produced by the target function during test. Not only can the expected number of arguments and expected argument values sent to each external function be compared with what were actually sent during test, but also the expected context state, expected return value, and expected error conditions can be compared with actual results as well.

Some embodiments use the dynamic programming language nature of JavaScript® or other ECMAScripts to automatically create and swap the code external functions with mock code during runtime, thus speeding test writing while ensuring high accuracy.

Some embodiments in accordance with the present disclosure relate to a method of testing a function using a mock function and test case definition. The method includes receiving a test case definition for a target function to be tested, the test case definition including an expected number of arguments and expected argument values to be sent in a call from the target function to an external function, automatically creating a mock function using the test case definition, and replacing the external function called in the target function with the mock function. The method further includes calling the target function, the target function calling the mock function, determining whether the target function called the mock function with the expected number of arguments and expected argument values, and sending a failure or success report based on the determination.

The method can further include receiving an expected context state, saving an original context state before calling the target function, determining whether a context state underlying the function is the expected context state, and restoring the original context state after calling the target function. Error messages can be generated based on the determinations. The error message(s) for determining whether the target function called the mock function with the expected number of arguments and expected argument values, and the error message(s) for determining whether the context state underlying the function is the expected context state can be normalized with respect to each other.

The method can further include receiving an expected return value for the function and determining whether a value returned from calling the target function is the expected return value. Alternatively or in conjunction with the foregoing, the method can include receiving an expected error condition, attaching (e.g. by wrapping it in try/catch statements) an error handler to the target function, and determining whether an exception thrown while calling the target function is the expected error condition.

Yet other embodiments relate to systems and machine-readable tangible storage media that employ or store instructions for the methods described above.

A further understanding of the nature and the advantages of the embodiments disclosed and suggested herein may be realized by reference to the remaining portions of the specification and the attached drawings.

The figures will be used below to illustrate different embodiments in accordance with the invention. The figures are specific examples of embodiments and should not be interpreted as limiting embodiments, but rather exemplary forms and procedures.

DETAILED DESCRIPTION OF THE INVENTION

Generally described are methods and tools for replacing external functions called in a target function that is to be tested with automatically-created mock functions, executing the function, and then comparing the results with a programmer's expected results. Expected results can include the expected number, type, and value of arguments sent to the mock function, the expected number of calls to the mock function, the expected changes to the context state, expected return values, and expected error conditions.

One aspect offers to automatically generate mock interfaces by leveraging the dynamic nature of certain languages (such as JavaScript or ActionScript). A programmer/developer uses a declarative syntax to describe the code to be tested. The description specifies the properties set and to what values the properties are set, the methods called, including how many times and with what arguments, and the expected return value and possible error conditions.

That description is then fed to a function tester along with input parameters for that test. Prior to running the test, the function tester instruments the code by swapping methods and function calls and replaces them with mock versions of functions (under mock objects) which will intercept the calls. This way, the system can ensure the expected calls are made the expected number of times with the expected arguments. The system also allows returning mock return values.

If the test fails, human readable error messages are automatically generated by the function tester. In some cases, the function tester swaps the original functions and methods back in place of the mock functions and reverts modified properties to their original values.

A "mock object" includes a simulated object that controllably and deterministically mimics the behavior of a normal object. Mock objects are often used in testing programs or portions of programs that call external objects in which the external objects are non-deterministic, slow, or still being developed.

A "mock function" includes a function that controllably and deterministically mimics the behavior of a normal function to be called. Mock functions are used in testing programs or portions of programs that call external functions for many of the same reasons that mock objects are employed.

Figure 1:
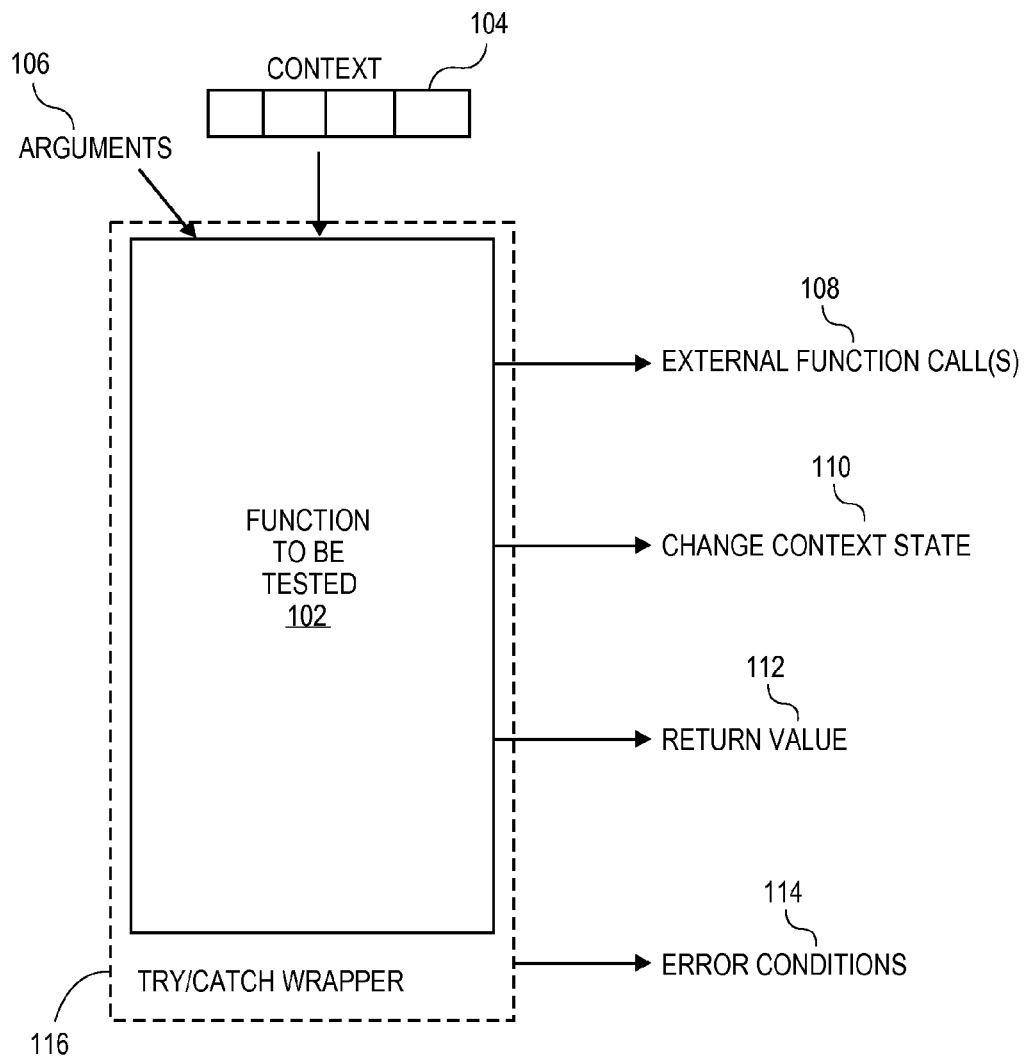
FIG. 1 illustrates a function to be tested in accordance with an embodiment.

FIG. 1 illustrates a function to be tested in accordance with an embodiment. Function 102 has context 104, which includes an object upon which the method is associated. Context 104 and its states, or internal variables and properties, is recognized as implicit input into the function. Arguments 106 are explicit inputs into the function.

External function calls 108 from function 102 can be considered implicit outputs, as well as any changed context state 110 of the object associated with function 102. Explicit outputs include return value 112. In many programming languages, a function can only return one value or pointer in its return value. In other programming languages, a function can return more than one value. In programming languages in which only one return value can be returned, output values are sometimes passed back to the calling routine through 'by value' or pointer arguments.

Error conditions 114 can also be considered an output from function 102. In some languages, error conditions can be trapped by a try/catch wrapper, such as try/catch wrapper 116. In other languages, code at the bottom of the function 'catches' the error that falls through the code and performs error handling.

Several 'inputs' and 'outputs' go into and out of a function, some of which are implicit and others explicit. Recognizing this, the inputs can be prepared for test and the outputs can be instrumented to determine whether the target function passes or fails the test.

Figure 2:
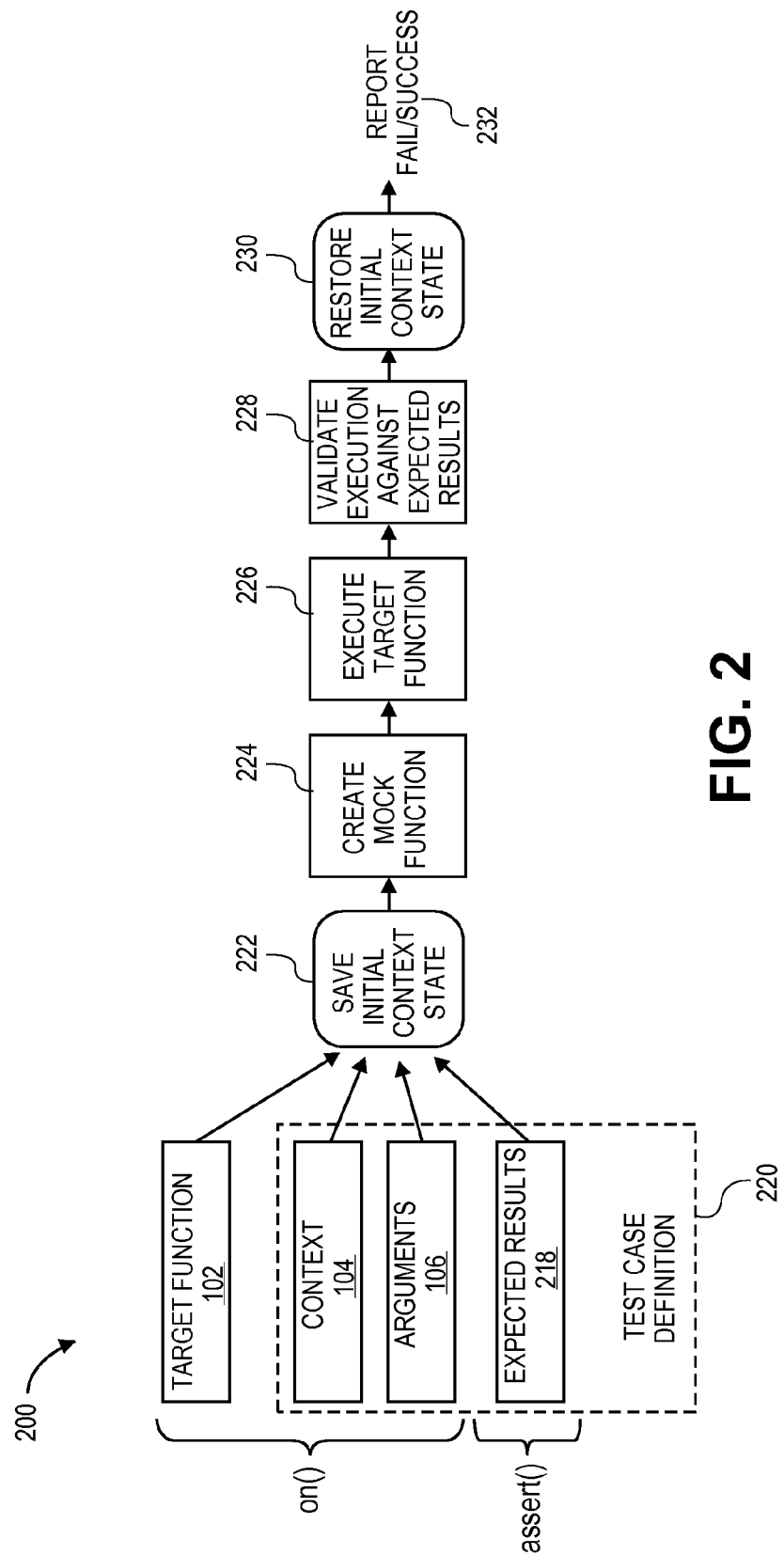
FIG. 2 is a process flow diagram in accordance with an embodiment.

FIG. 2 is a process flow diagram in accordance with an embodiment. Target function 102 and test case definition 220, which includes context 104, arguments 106, and expected results 218, are fed into process 200. In an exemplary embodiment as will be shown later, target function 102, context 104, and arguments 106 can be fed through an on( ) function, while expected results 218 can be fed through an assert( ) function.

In the exemplary embodiment, the initial state of the context is saved in operation 222, either before or after creating a mock function or mock functions in operation 224. After creating mock function(s) in operation 224, target function 102 is executed in operation 226. Target function calls mock function(s) during its execution, alters the context state, and outputs a return result and/or error. After execution of the target function in operation 226, the execution is validated against expected results 218 in operation 228. At this time, success or failure messages can be sent to the user, stored in a log, or otherwise reported in operation 232. Also after execution, the initial, original context state is restored.

Restoring the original context state allows further program execution without endangering other portions of the program that rely upon the context state. Thus, the test is run in a hot-swap mode. Changing the original function and context and restoring them back can be accomplished in dynamic programming languages such as JavaScript, but may be extremely difficult, if not impossible in other programming languages. Hot swapping test instrumentation in functions of a dynamic programming language can speed debugging and development of such functions.

Figure 3:
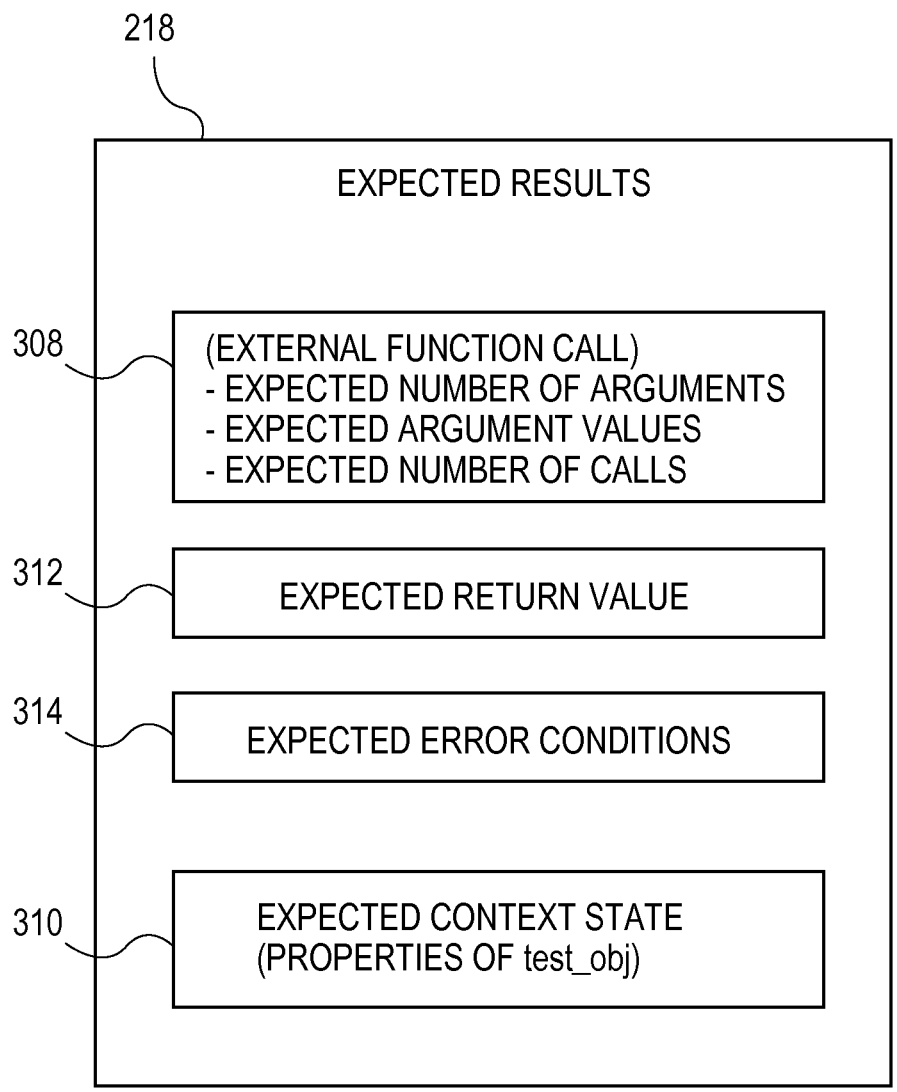
FIG. 3 illustrates example expected results in accordance with an embodiment.

FIG. 3 illustrates example expected results in accordance with an embodiment. Expected results 218 includes expected results relating to external function calls, such as an expected number of arguments and expected argument values in section 308. Expected results 218 also includes an expected return value or values 312 from the target function, such as that returned by the 'return' keyword in JavaScript. Expected error conditions 314 are included, such as those thrown by the throw new Error( ) keyword phrase in JavaScript. Expected context state 310 is also part of expected results 218 and can include expected property values, settings, etc. for the context upon which the target function is anchored.

Figure 4:
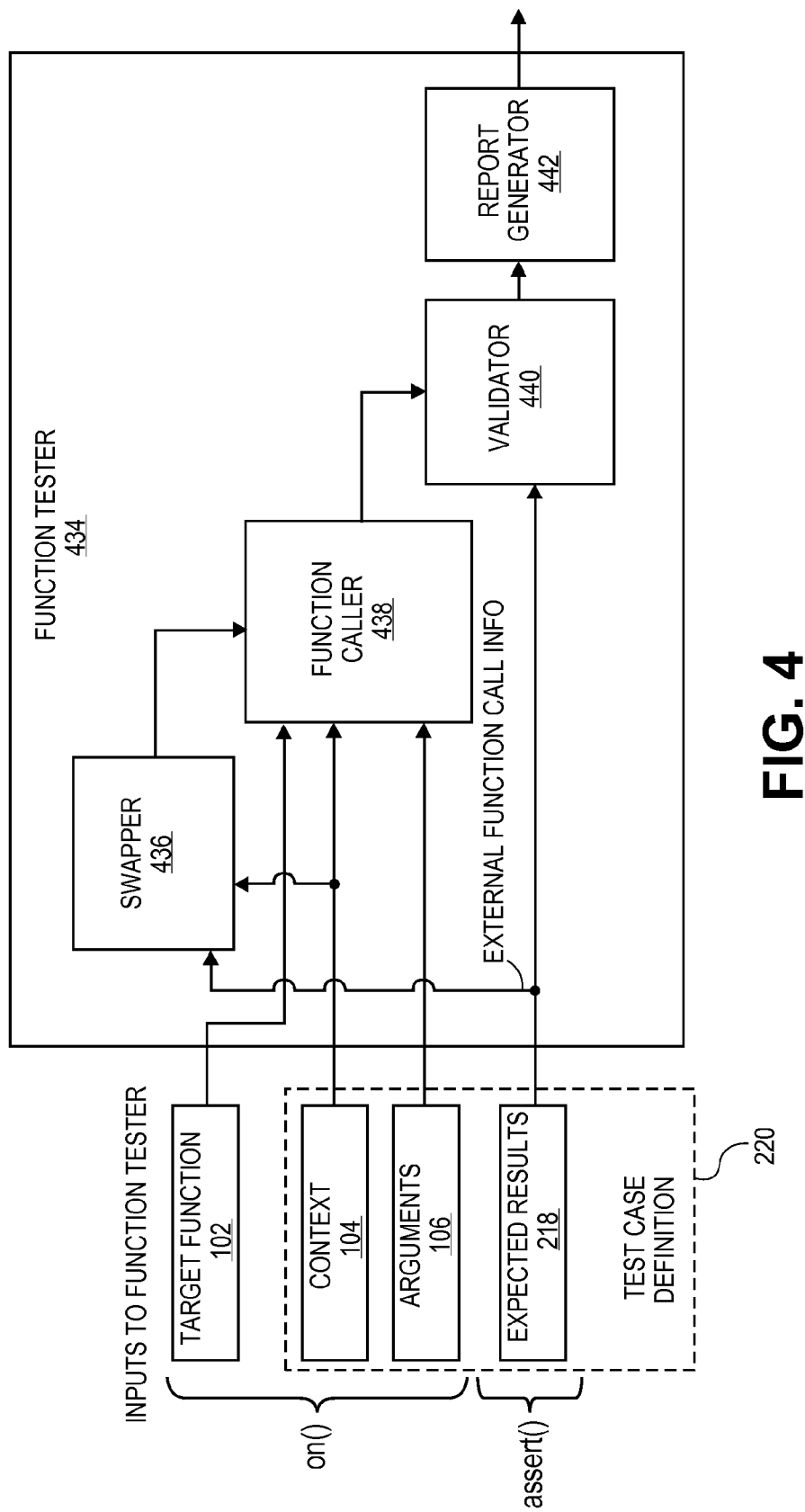
FIG. 4 illustrates a function tester in accordance with an embodiment.

FIG. 4 illustrates a function tester in accordance with an embodiment. Function tester 434 includes swapper 436, function caller 438, validator 440, and report generator 442.

Target function 102 is input into swapper 436. Expected results 218 are also input into swapper 436. Expected results 218 are used to create mock functions that can be swapped with external functions that would have otherwise been called by target function 102. Swapper 436 replaces external functions called by function 102 with mock functions. In some embodiments, swapper 436 replaces mock functions with the originals of the external functions after each test.

Target function 102 is also input into function caller 438 so that function caller 438 knows which function is to be tested. Context 104 is input into function caller 438 so that target function 102 is called under the correct context. Function caller 438 can make a direct call to the context (dot) function or can use indirect means. Arguments are input into function caller 438 so that the arguments can be placed in the call to target function 102.

Validator 440 accepts inputs from expected results 218. Validator 440 compares expected results, such as the expected number of arguments and expected argument values in a function call with those that came from the target function 102. If the actual number of arguments called from the target function to the mock function is different than the expected number of arguments, that part of the test is a failure. The failure can be reported in report generator 442 and output in real time, in a log file, etc. to a developer, programmer, or other user.

Test case definition 220 can have various implementations in code. One such set of code implementations is in Table 1. An example function to be tested (i.e., a target function) is in the 2nd column, and a test case definition to test the target function is in the 3rd column of the table.

TABLE 1

| | Function to be Tested | Test Case Definition |
|---|---|---|
| Return Value | function aFunction ( ) {<br>    return "aValue"<br>} | on(aFunction).assert({<br>    returnValue: "aValue";<br>}); |
| Error | function aFunction( ) {<br>    throw new<br>Error("anError");<br>} | on(aFunction).assert({<br>    errorThrown: "anError";<br>}); |
| Property Set | var obj = {<br>    prop: "prop"<br>};<br>function aFunction (value) {<br>    obj.prop = value;<br>} | var aValue = { };<br>on(<br>    aFunction,<br>    null,<br>    [aValue]<br>).assert({<br>    propertiesSet: [{<br>        name: "prop",<br>        object: obj,<br>        value: aValue<br>    }]<br>}); |
| Method Call | var obj = {<br>    method: function(arg) {<br>        return arg;<br>    }<br>};<br>function aFunction (value) {<br>    obj.method(value);<br>} | var aValue = { };<br>on(<br>    aFunction,<br>    null,<br>    [aValue]<br>).assert({<br>    methodsCalled: [{<br>        name: "method",<br>        object: obj,<br>        arguments: [aValue],<br>        returnValue: aValue<br>    }]<br>}); |
| Routing | myClass.prototype = {<br>    method: function (bool) {<br>        if (bool === true) {<br>            this.methodA(0 , 1);<br>        } else {<br>            This.methodB(2, 3)<br>        } | var obj = { };<br>on(<br>    myClass.prototype.method,<br>    obj,<br>    [true]<br>).assert({<br>    methodsCalled: [{<br>        name: "methodA", |

TABLE 1-continued

| Function to be Tested | Test Case Definition |
|---|---|
| },<br>  methodA: function (a0, a1)<br>  {<br>    // ...<br>  },<br>  methodB: function (b0, b1)<br>  {<br>    // ...<br>  }<br>}; |         arguments: [0, 1]<br>    }]<br>  });<br>on(<br>  myClass.prototype.method,<br>  obj,<br>  [false]<br>).assert({<br>  methodsCalled: [{<br>    name: "methodB",<br>    arguments: [2, 3]<br>  }]<br>}); |

Code pertaining to setting a property in an external object is in the 'Property Set' row of Table 1. The target function, aFunction, takes in a single argument, called 'value', and applies (i.e., writes) it to property 'prop' of object 'obj'. A test case definition for the property-setting target function is shown in the 3rd column. In the on( ) function, aFunction is specified, no context is given (signified by 'null'), and aValue, a previously declared variable, is set as the argument list for testing aFunction. In the assert( ) function, it is specified that properties are to be set, including a property with the name 'prop' belonging to object 'obj'. The expected value of the property should be 'aValue', the variable in the argument list to aFunction.

In an embodiment, function tester 434 takes the on( ) and assert functions and creates a mock object with a property that simulates object 'obj' with property 'prop'. Function tester 434 modifies function aFunction so that it calls the mock object and its property instead of obj.prop. Function caller 438 then calls aFunction as modified. After execution of modified aFunction, validator 440 of function tester 434 compares what aFunction should have done to what it did. That is, whether the property of the external object was set to same value as the single argument input into the function is checked.

Figure 5:
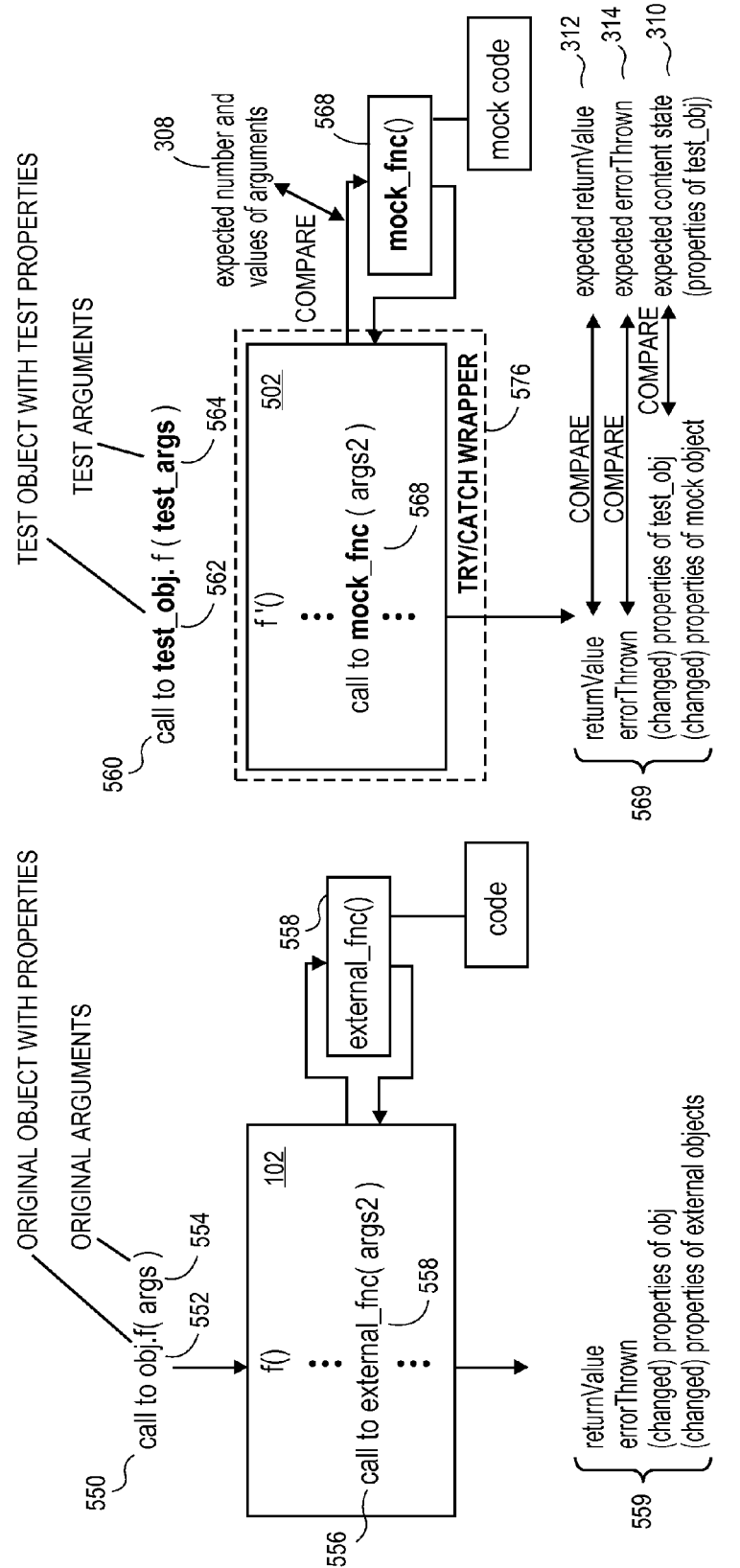
FIG. 5A illustrates a function in its original state in accordance with an embodiment.
FIG. 5B illustrates the function of FIG. 5A instrumented for test.

FIG. 5A illustrates a function in its original state in accordance with an embodiment. In a normal, non-test program, call 550 to the native target function includes specifying its original object 552 and arguments 554. From this call, target function 102 is called, which has its own call 556 to external function 558. Outputs 559 include any return value, errors thrown, or changed properties or variables of original object 552 or external objects. For testing, given the function and a test case definition, a function tester can modify the original function in order to test it.

FIG. 5B illustrates the function of FIG. 5A instrumented for test. Function 102 has been modified into function 502 by swapping out a call to external function 558 with a call to mock function 568. Try/catch wrapper 576 has been wrapped around function 502 in order to catch uncontained errors for analysis by the validator of the function tester. Function 502 is called with test context 562 and test arguments 564 as specified in a test case definition. Function 502 calls mock function 568 and may or may not generate an uncontained error caught by try/catch wrapper 576. Outputs 569 include those similar to outputs 559. Outputs 569 are compared with expected return value 312, expected error conditions 314, and expected context state 310. Expected number and values of arguments 308 are compared against the actual number and values of arguments sent by function 502 to mock function 568.

Embodiments that automatically create mock functions from test case definitions and automatically modify the target function can minimize errors in programming by hand. Automatically, without human intervention inbetween, saving initial context states, executing the modified function, performing validations, and restoring initial context states can also reduce such errors. Different steps can be automated depending on the complexity and comprehensiveness of the testing.

Figure 6:
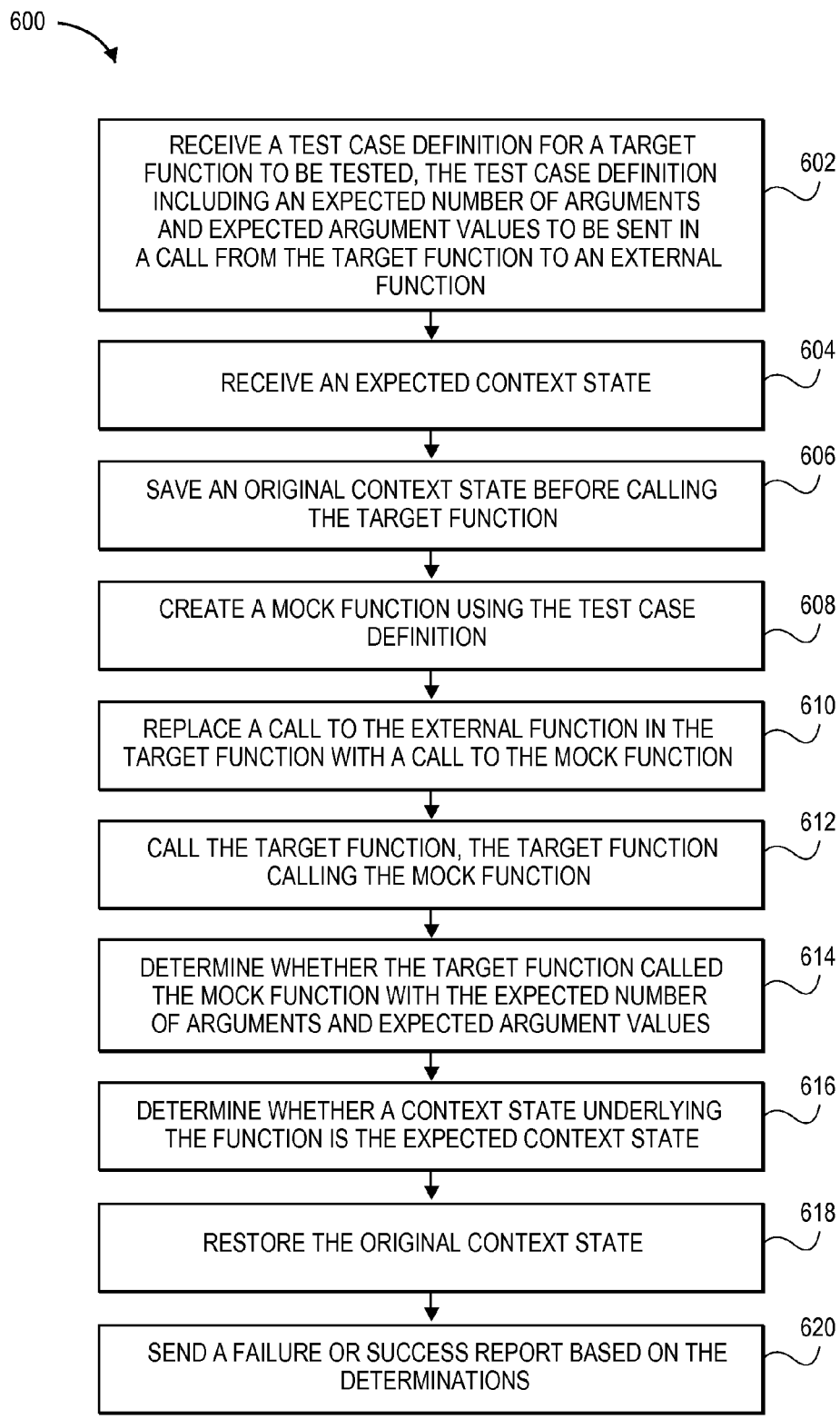
FIG. 6 is a flowchart illustrating an embodiment in accordance with the present invention.

FIG. 6 shows an example flowchart illustrating a process in accordance with one embodiment. This process can be automated in a computer or other machine. The process can be coded in software, firmware, or hard coded as machine-readable instructions and run through a processor that can implement the instructions. In operation 602, a test case definition for a target function to be tested is received, the test case definition including an expected number of arguments and expected argument values to be sent in a call from the target function to an external function. In operation 604, an expected context state is received. In operation 606, an original context state is saved (before calling the target function). In operation 608, a mock function is created using the test case definition. In operation 610, a call to the external function in the target function is replaced with a call to the mock function. In operation 612, the target function is called, which calls the mock function. In operation 614, it is determined whether the target function called the mock function with the expected number of arguments and with the expected argument values. In operation 616, it is determined whether a context state underlying the function is the expected context state. In operation 618, the original context state is restored. In operation 620, a failure and/or success report, based on the determinations, is sent. A developer, programmer, or other user can view the report and make corrections to the target function as needed.

Figure 7:
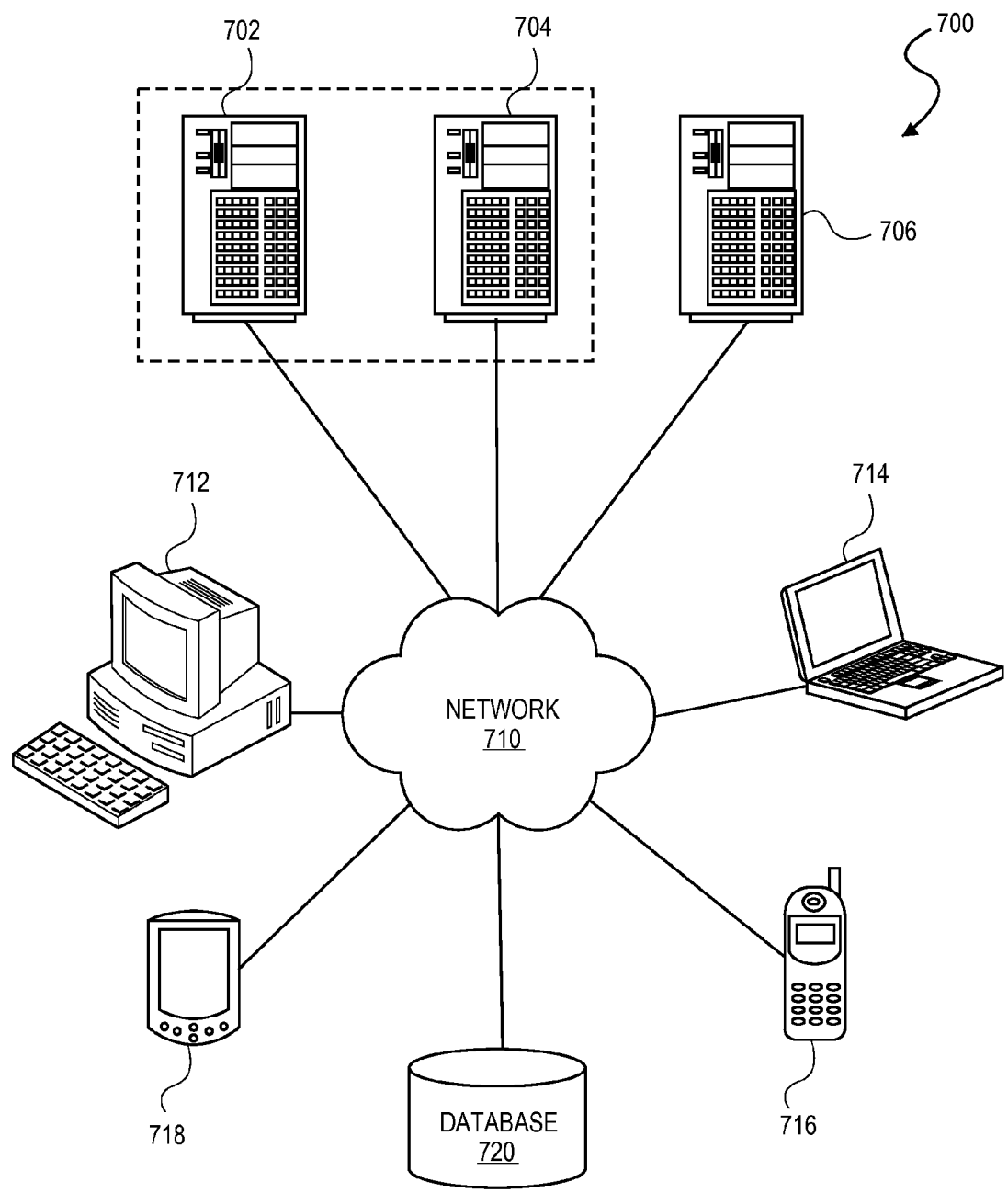
FIG. 7 illustrates components of a computer network that can be used in accordance with one embodiment.

FIG. 7 is a block diagram illustrating components of an exemplary operating environment in which various embodiments of the present invention may be implemented. The system 700 can include one or more user computers, computing devices, or processing devices 712, 714, 716, 718, which can be used to operate a client, such as a dedicated application, web browser, etc. The user computers 712, 714, 716, 718 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 712, 714, 716, 718 may also have any of a variety of applications, including one or more development systems, database client and/or server applications, and Web browser applications. Alternatively, the user computers 712, 714, 716, 718 may be any other electronic device, such as a thin-client computer, Internet-enabled gaming system, and/or personal messaging device, capable of communicating via a network (e.g., the network 710 described below) and/or displaying and navigating Web pages or other types of electronic documents. Although the exemplary system 700 is shown with four user computers, any number of user computers may be supported.

In most embodiments, the system 700 includes some type of network 710. The network can be any type of network familiar to those skilled in the art that can support data communications using any of a variety of commercially-available protocols, including without limitation TCP/IP, SNA, IPX, AppleTalk, and the like. Merely by way of example, the network 710 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 702, 704, 706 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 706) may be dedicated to running applications, such as a business application, a Web server, application server, etc. Such servers may be used to process requests from user computers 712, 714, 716, 718. The applications can also include any number of applications for controlling access to resources of the servers 702, 704, 706.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 712, 714, 716, 718. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 712, 714, 716, 718.

The system 700 may also include one or more databases 720. The database(s) 720 may reside in a variety of locations. By way of example, a database 720 may reside on a storage medium local to (and/or resident in) one or more of the computers 702, 704, 706, 712, 714, 716, 718. Alternatively, it may be remote from any or all of the computers 702, 704, 706, 712, 714, 716, 718, and/or in communication (e.g., via the network 710) with one or more of these. In a particular set of embodiments, the database 720 may reside in a storage-area network ("SAN") familiar to those skilled in the art. Similarly, any necessary files for performing the functions attributed to the computers 702, 704, 706, 712, 714, 716, 718 may be stored locally on the respective computer and/or remotely, as appropriate. In one set of embodiments, the database 720 may be a relational database, such as Oracle 10g, that is adapted to store, update, and retrieve data in response to SQL-formatted commands.

Figure 8:
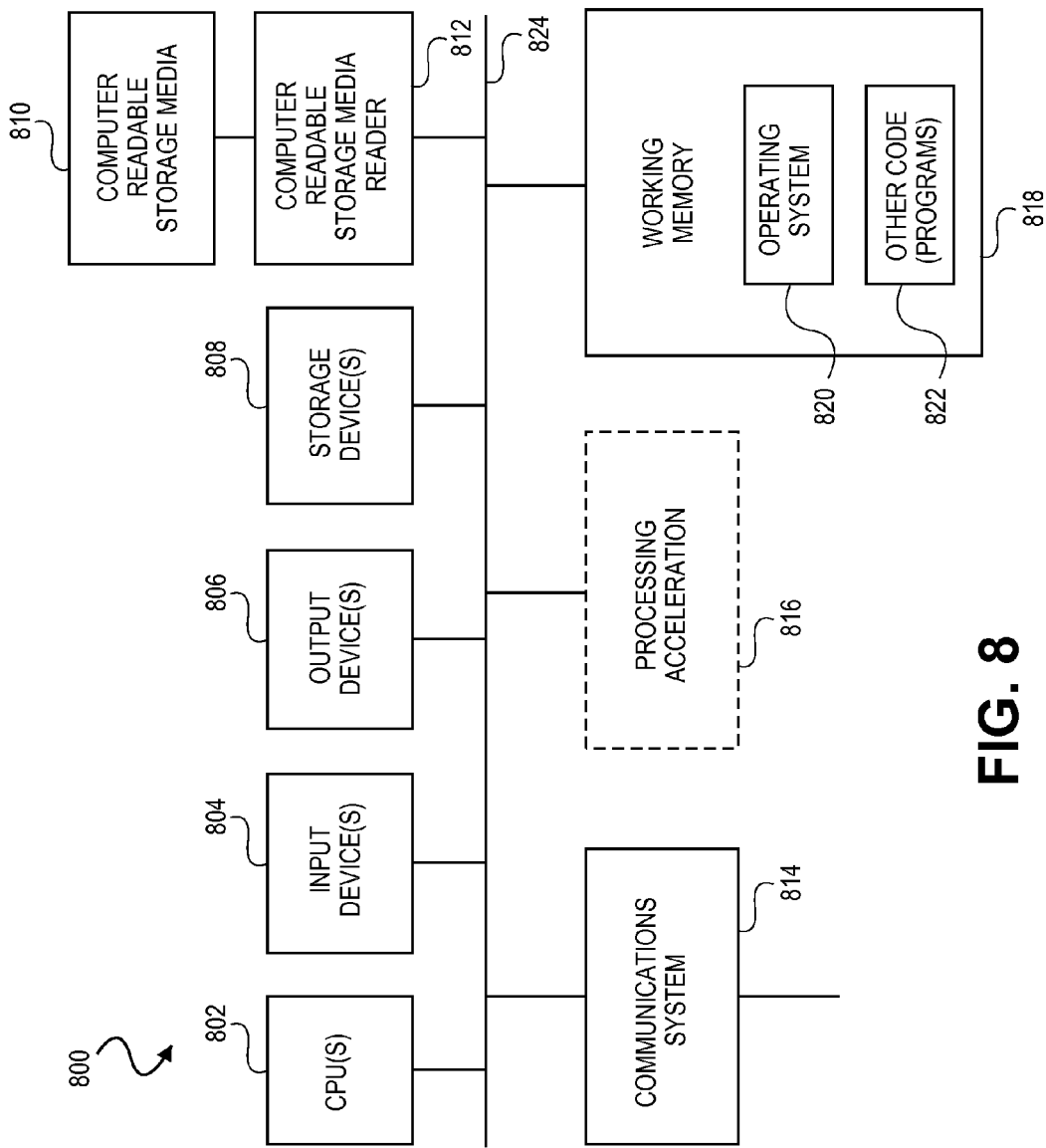
FIG. 8 illustrates components of a computerized device that can be used in accordance with one embodiment.

FIG. 8 illustrates an exemplary computer system 800, in which various embodiments of the present invention may be implemented. The system 800 may be used to implement any of the computer systems described above. The computer system 800 is shown comprising hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). The computer system 800 may also include one or more storage devices 808. By way of example, the storage device(s) 808 can include devices such as disk drives, optical storage devices, solid-state storage device such as a random access memory ("RAM") and/or a read-only memory ("ROM"), which can be programmable, flash-updateable and/or the like.

The computer system 800 may additionally include a computer-readable storage media reader 812, a communications system 814 (e.g., a modem, a network card (wireless or wired), an infra-red communication device, etc.), and working memory 818, which may include RAM and ROM devices as described above. In some embodiments, the computer system 800 may also include a processing acceleration unit 816, which can include a digital signal processor DSP, a special-purpose processor, and/or the like.

The computer-readable storage media reader 812 can further be connected to a computer-readable storage medium 810, together (and, optionally, in combination with storage device(s) 808) comprehensively representing remote, local, fixed, and/or removable storage devices plus storage media for temporarily and/or more permanently containing, storing, transmitting, and retrieving computer-readable information. The communications system 814 may permit data to be exchanged with the network and/or any other computer described above with respect to the system 800.

The computer system 800 may also comprise software elements, shown as being currently located within a working memory 818, including an operating system 820 and/or other code 822, such as an application program (which may be a client application, Web browser, mid-tier application, RDBMS, etc.). It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

What is claimed is:

1. A method of testing functions using mock functions, the method comprising:
   receiving information at a function tester specified using a declarative syntax that defines a test case definition for a target function to be tested by the function tester, the test case definition including an expected number of arguments to one or more external functions to be called in the target function and expected argument values for the expected number of arguments to be sent in a call to each of the one or more external functions from the target function;
   creating, using a processor operatively coupled to a memory, a mock function for an external function to be called in the target function based on the received test case definition for the target function;
   replacing the external function to be called in the target function with the mock function created based on the received test case definition for the target function;
   calling the mock function in response to calling the target function;
   determining whether the mock function was called with an expected number of arguments to the external function and expected argument values for the expected number of arguments defined according to the received test case definition for the target function; and
   generating information indicative of a failure or success based on the determination whether the mock function was called with the expected number of arguments to the external function and the expected argument values for the expected number of arguments defined according to the received test case definition for the target function.

2. The method of claim 1 further comprising:
   receiving an expected context state;
   saving an original context state before calling the target function;
   determining whether a context state underlying the function is the expected context state; and
   restoring the original context state after calling the target function.

3. The method of claim 2 further comprising:
   generating one or more error messages based on the determinations, an error message for determining whether the mock function was called with the expected number of arguments and expected argument values to the expected number of arguments defined according to the received test case definition for the target function and an error message for determining whether the context state underlying the function is the expected context state being normalized with respect to each other.

4. The method of claim 1 further comprising:
   determining an expected return value for the target function based on the received test case definition for the target function; and
   determining whether a value returned from calling the target function satisfies the expected return value defined according to the received test case definition for the target function.

5. The method of claim 1 further comprising:
   determining an expected error condition based on the received test case definition for the target function;
   attaching an error handler to the target function; and
   determining whether an exception thrown while calling the target function satisfies the expected error condition defined according to the received test case definition for the target function.

6. The method of claim 5 wherein the attaching an error handler includes wrapping a try/catch wrapper around the target function.

7. The method of claim 1 wherein the replacing the external function to be called in the target function with the mock function occurs automatically in conjunction with the creating the mock function based on the received test case definition for the target function.

8. The method of claim 1 wherein the replacing occurs during code execution.

9. The method of claim 1 wherein the information indicative of a failure or success comprises one or more human-readable messages.

10. The method of claim 1 wherein the target function is a method.

11. The method of claim 1 wherein the expected number of arguments to the external function is implicit in the number of expected argument values defined according to the received test case definition for the target function.

12. The method of claim 1 wherein the target function is part of a class for a graphical shape.

13. The method of claim 1 wherein the target function is implemented in ECMAScript.

14. The method of claim 13 wherein the ECMAScript is a programming language selected from the group consisting of JavaScript, JScript, and ActiveScript.

15. The method of claim 1 wherein the operations are performed in the order shown.

16. The method of claim 1 wherein each operation is performed by the processor operatively coupled to the memory.

17. A non-transitory machine-readable storage medium embodying information indicative of instructions for causing one or more machines to perform the operations of claim 1.

18. A computer system executing instructions in a computer program, the computer program instructions comprising program code for performing the operations of claim 1.

19. A non-transitory machine-readable medium embodying information indicative of instructions for causing one or more machines to test functions using mock functions, the non-transitory machine-readable medium comprising:
   code for receiving information specified using a declarative syntax that defines a test case definition for a target function to be tested, the test case definition including an expected number of arguments to one or more external functions to be called in the target function and expected argument values for the expected number of arguments to be sent in a call to each of the one or more external functions from the target function;

code for creating a mock function for an external function to be called in the target function based on the received test case definition for the target function;

code for replacing the external function to be called in the target function with the mock function created based on the received test case definition for the target function;

code for calling the target function, the target function calling the mock function;

code for determining whether the target function called the mock function with the expected number of arguments and the expected argument values for the expected number of arguments defined according to the received test case definition for the target function; and code for generating information indicative of a failure or success report based on the determination whether the target function called the mock function with the expected number of arguments to the external function and the expected argument values for the expected number of arguments defined according to the received test case definition for the target function.

20. A computer system comprising:

at least one processor; and a memory operatively coupled to the at least one processor and configured to store program code that configures the at least one processor to:

receive information specified using a declarative syntax that defines a test case definition for a target function to be tested by the function tester, the test case definition including an expected number of arguments to one or more external functions to be called in the target function and expected argument values for the expected number of arguments to be sent in a call to each of the one or more external functions from the target function;

create a mock function for an external function to be called in the target function based on the received test case definition for the target function;

replace the external function to be called in the target function with the mock function created based on the received test case definition for the target function;

determine whether a call to the target function called the mock function with an expected number of arguments to the external function and expected argument values for the expected number of arguments defined according to the received test case definition for the target function; and generate information indicative of a failure or success report based on the determination whether the call to the target function called the mock function with the expected number of arguments to the external function and the expected argument values for the expected number of arguments defined according to the received test case definition for the target function.

* * * * *